United States Patent
Hong et al.

(10) Patent No.: US 11,148,568 B2
(45) Date of Patent: Oct. 19, 2021

(54) HEADREST POSITION ADJUSTING DEVICE FOR VEHICLE

(71) Applicants: Hyundai Motor Company, Seoul (KR); Kia Motors Corporation, Seoul (KR)

(72) Inventors: Suk Won Hong, Bucheon-Si (KR); Gil Ju Kim, Seoul (KR); Sung Hak Hong, Suwon-Si (KR); Yo Han Kim, Ansan-Si (KR); Sang Do Park, Suwon-Si (KR); Doo Ri Kim, Goyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 16/870,522

(22) Filed: May 8, 2020

(65) Prior Publication Data
US 2021/0170928 A1 Jun. 10, 2021

(30) Foreign Application Priority Data
Dec. 10, 2019 (KR) .................. 10-2019-0163259

(51) Int. Cl.
| | |
|---|---|
| *B60N 2/853* | (2018.01) |
| *B60N 2/829* | (2018.01) |
| *B60N 2/02* | (2006.01) |
| *B60N 2/806* | (2018.01) |
| *A47C 7/36* | (2006.01) |
| *B60N 2/865* | (2018.01) |
| *B60N 2/888* | (2018.01) |
| *A47C 7/38* | (2006.01) |

(Continued)

(52) U.S. Cl.
CPC ........... *B60N 2/829* (2018.02); *B60N 2/0244* (2013.01); *A47C 7/36* (2013.01); *A47C 7/38* (2013.01); *B60N 2/806* (2018.02); *B60N 2/821* (2018.02); *B60N 2/853* (2018.02); *B60N 2/865* (2018.02); *B60N 2/868* (2018.02); *B60N 2/888* (2018.02); *B60N 2002/0268* (2013.01)

(58) Field of Classification Search
CPC ........ B60N 2/806; B60N 2/829; B60N 2/853; B60N 2/865; B60N 2/868; B60N 2/888; B60N 2/821; A47C 7/36; A47C 7/38
See application file for complete search history.

(56) References Cited

U.S. PATENT DOCUMENTS 5,054,856 A * 10/1991 Wang ..................... B60N 2/865
297/408
5,332,287 A * 7/1994 Whitmyer ............... A47C 7/38
297/405

(Continued)

*Primary Examiner* — Syed A Islam
(74) *Attorney, Agent, or Firm* — Morgan, Lewis & Bockius LLP

(57) ABSTRACT

A headrest position adjusting device for a vehicle, may include a first motor mounted to a seatback frame; a first link connected to the first motor to be rotatable to a predetermined first angle in a leftward-rightward direction; a second motor mounted to the first link; a second link connected to the second motor to be rotatable to a predetermined angle in an upward-downward direction; a third motor mounted to the second link; a third link connected to the third motor to be rotatable with respect to a rotation axis of the third motor; and a headrest frame connected to the third link and mounted in a headrest pad.

13 Claims, 8 Drawing Sheets

(51) Int. Cl.
  *B60N 2/868* (2018.01)
  *B60N 2/821* (2018.01)

(56) References Cited

U.S. PATENT DOCUMENTS

| | | | | |
|---|---|---|---|---|
| 5,822,707 A * | 10/1998 | Breed | ............... | B60N 2/2806 |
| | | | | 701/49 |
| 6,199,947 B1 * | 3/2001 | Wiklund | ............... | B60N 2/838 |
| | | | | 297/216.12 |
| 6,857,704 B2 * | 2/2005 | Stenzel | ............... | A47C 7/38 |
| | | | | 297/408 |
| 7,640,090 B2 * | 12/2009 | Uchida | ............... | B60N 2/002 |
| | | | | 701/49 |
| 7,832,803 B2 * | 11/2010 | Cassaday | ............... | B60N 2/856 |
| | | | | 297/408 |
| 7,914,079 B2 * | 3/2011 | Link | ............... | A47C 7/38 |
| | | | | 297/408 |
| 8,662,591 B2 * | 3/2014 | Lin | ............... | A47C 7/38 |
| | | | | 297/397 |
| 8,801,103 B2 * | 8/2014 | Bittinger | ............... | B60N 2/874 |
| | | | | 297/391 |
| 9,061,616 B2 * | 6/2015 | Kondrad | ............... | B60N 2/34 |
| 9,315,130 B2 * | 4/2016 | Kondrad | ............... | B60N 2/821 |
| 9,333,887 B2 * | 5/2016 | Talamonti | ............... | B60N 2/821 |
| 10,327,554 B2 * | 6/2019 | DuFresne | ............... | A47C 7/38 |
| 2020/0062145 A1 * | 2/2020 | Little | ............... | B60N 2/0248 |
| 2020/0369188 A1 * | 11/2020 | Samain | ............... | B60N 2/829 |
| 2021/0031661 A1 * | 2/2021 | Bulle | ............... | B60N 2/853 |

\* cited by examiner

HEADREST POSITION ADJUSTING DEVICE FOR VEHICLE

CROSS-REFERENCE TO RELATED APPLICATION

The present application claims priority to Korean Patent Application No. 10-2019-0163259 filed on Dec. 10, 2019, the entire contents of which is incorporated herein for all purposes by this reference.

BACKGROUND OF THE INVENTION

Field of the Invention

The present invention relates to a headrest position adjusting device for a vehicle. More particularly, it relates to a headrest position adjusting device for a vehicle, which rotates a headrest in at least one of an X-axis direction thereof, a Y-axis direction thereof, or a Z-axis direction in accordance with the position of an occupant's head.

Description of Related art

As is well known, a seat of a vehicle includes a seat cushion for supporting the lower portion of an occupant's body, a seatback for supporting the upper portion of an occupant's body, and a headrest for supporting the neck and the head of an occupant.

The headrest is configured to provide not only a basic function of supporting the neck and the head of an occupant but also an active headrest function of preventing the occupant's head from whipping backwards upon impact.

FIG. 1 and FIG. 2 are views illustrating the mounting structure of a conventional headrest.

As shown in FIG. 1 and FIG. 2, a conventional headrest 10 includes a headrest pad 12 and a headrest frame 14 mounted in the headrest pad 12 to form the basic structure of the headrest 10.

Furthermore, hollow pole guides 22 are mounted to a seatback frame 20 to mount the headrest 10 to a seatback.

Accordingly, poles 16, which extend from the headrest frame 14, are inserted into the pole guides 22 in a lockable manner, completing the installation of the headrest.

The conventional headrest configured as described above is adjustable only in height in an upward-downward direction thereof.

That is, the height of the headrest may be adjusted by moving the headrest poles 16, inserted into the pole guides 22, upwards or downwards in accordance with the body type of an occupant.

However, the above conventional headrest has the following disadvantages.

First, there is no problem when an occupant rests the head on the headrest while sitting upright. However, when the occupant's head is tilted toward one side of the headrest beyond the support area of the headrest, the occupant's head may not be appropriately supported by the headrest, and accordingly, the risk of injury to the head or the neck may increase in the event of a collision.

Furthermore, when the occupant's head is maintained in the state of being tilted to the left side or the right side of the headrest for a long time, for example, while the occupant is asleep, muscular stiffness or muscular pain in the occupant's neck may result.

For example, when an occupant accommodated in the front passenger seat or in the second-row seat dozes off or sleeps, the occupant's head may unconsciously tilt to one side of the headrest due to vehicle vibration or muscle relaxation. In the instant case, the occupant's head may not be appropriately supported by the headrest. When the present state is maintained for a long time, the occupant may suffer from neck pain, and the risk of injury to the head or the neck in the event of a collision may increase.

Second, the occupant's head may be located in front of the headrest while being spaced from therefrom depending on the physical condition of the occupant. In the instant state, because the occupant's head is not appropriately supported by the headrest, the risk of injury to the head or the neck in the event of a collision may increase.

Third, in some cases, the occupant may desire to tilt the head further back depending on the physical condition of the occupant or the driving conditions. However, because the conventional headrest is adjustable only in height in the upward-downward direction thereof, it is not possible to adjust the position of the occupant head support portion of the headrest in the forward-backward direction thereof.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a headrest position adjusting device for a vehicle, which automatically moves a headrest in at least one of an X-axis direction thereof, a Y-axis direction thereof, or a Z-axis direction in accordance with the detected position of an occupant's head, or enables an occupant to directly move the headrest in at least one of the X-axis direction thereof, the Y-axis direction thereof, or the Z-axis direction as desired by the occupant, facilitating convenient and stable support of the occupant's head by the headrest in accordance with the physical condition of the occupant or the driving conditions.

The objects of the present invention are not limited to the above-mentioned objects, and other objects not mentioned herein will be clearly understood by those skilled in the art from the following description, and will become apparent with reference to the exemplary embodiments of the present invention. Furthermore, the objects of the present invention may be accomplished by the components described in the appended claims and combinations thereof.

Various aspects of the present invention provide a headrest position adjusting device for a vehicle, including a first motor mounted to a seatback frame, a first link connected to the first motor to be rotatable to a predetermined first angle in a leftward-rightward direction thereof, a second motor mounted to the first link, a second link connected to the second motor to be rotatable to a predetermined angle in an upward-downward direction thereof, a third motor mounted to the second link, a third link connected to the third motor to be rotatable in place, and a headrest frame connected to the third link and mounted in a headrest pad.

In an exemplary embodiment of the present invention, the first link may be oriented in the upward-downward direction thereof, and the rotation shaft of the first motor may be connected to the lower end portion of the first link to transmit rotational force thereto.

In another exemplary embodiment of the present invention, the first link may include a first mounting end portion integrally formed therewith, which is perpendicularly bent in a lateral direction at the upper end portion of the first link, and the second motor may be mounted on the first mounting end portion.

In yet another exemplary embodiment of the present invention, the second link may be oriented in the forward-backward direction thereof, and the rotation shaft of the second motor may be connected to the rear end portion of the second link to transmit rotational force thereto.

In yet another exemplary embodiment of the present invention, the second link may include a second mounting end portion integrally formed therewith, which is perpendicularly bent in the upward direction at the front end portion of the second link, and the third motor may be mounted on the second mounting end portion.

In still yet another exemplary embodiment of the present invention, the third link may be oriented in the upward-downward direction thereof, and the rotation shaft of the third motor may be connected to the lower end portion of the third link to transmit rotational force thereto.

In a further exemplary embodiment of the present invention, the third link may include an inclined surface formed at the upper end portion thereof, and the inclined surface may be inclined at the same angle as the angle at which the headrest frame is mounted to be welded to a portion of the headrest frame.

In another further exemplary embodiment of the present invention, the headrest position adjusting device may further include a head position sensor configured to detect the position of an occupant's head supported by a headrest, a manual switch configured to be manipulated by an occupant to manually adjust the position of the headrest, and a controller engaged to the head position sensor and the manual switch configured to receive a detection signal from the head position sensor or an operation signal from the manual switch and to apply a driving current signal to at least one of the first motor, the second motor, or the third motor.

In yet another further exemplary embodiment of the present invention, the head position sensor may be configured as a camera or an ultrasonic sensor mounted at a predetermined position in the interior of a vehicle.

In yet another further exemplary embodiment of the present invention, upon operation of the first motor, the first link may rotate in the leftward-rightward direction about the lower end portion thereof and the headrest frame may rotate in the leftward-rightward direction simultaneously therewith such that the angle to which the headrest is tilted in the leftward-rightward direction is adjusted.

In still yet another further exemplary embodiment of the present invention, upon operation of the second motor, the second link may rotate in the upward-downward direction about the rear end portion thereof and the headrest frame may rotate in the upward-downward direction simultaneously therewith such that the angle to which the headrest is tilted in the upward-downward direction is adjusted.

In a still further exemplary embodiment of the present invention, upon operation of the third motor, the third link may rotate in place and the headrest frame may rotate in the forward-backward direction about the third link simultaneously therewith such that the angle to which the headrest is tilted in the forward-backward direction is adjusted.

Other aspects and exemplary embodiments of the present invention are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
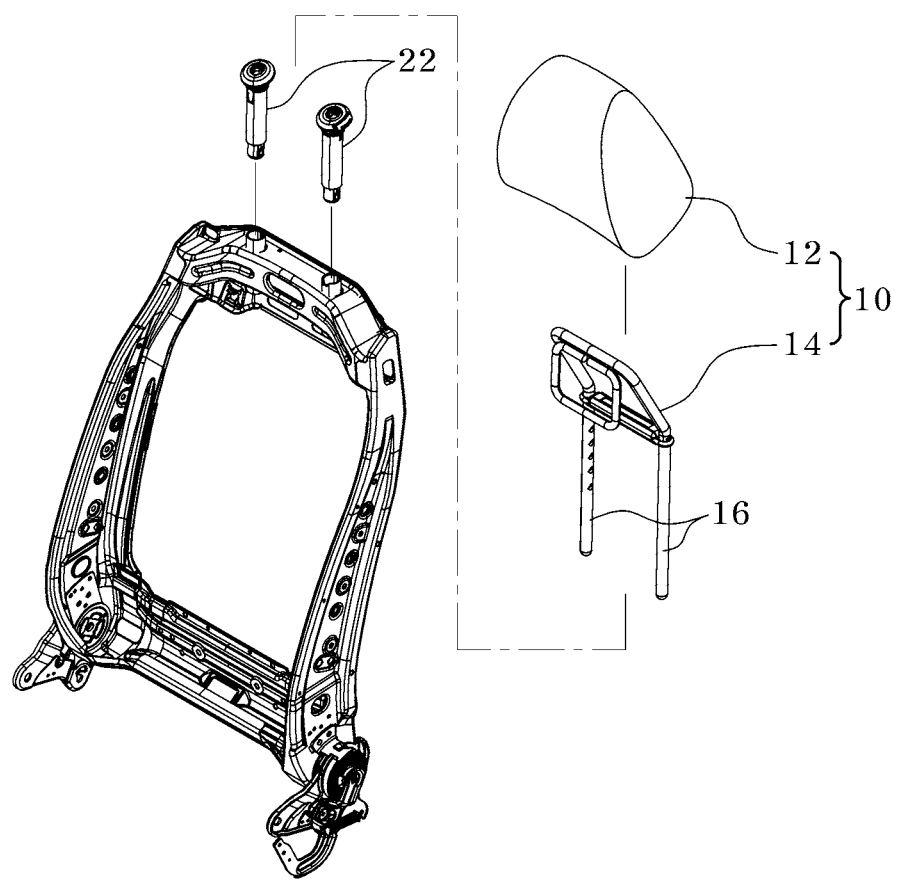
FIG. 1 is a perspective view of the mounting structure of a conventional headrest.
Figure 2:
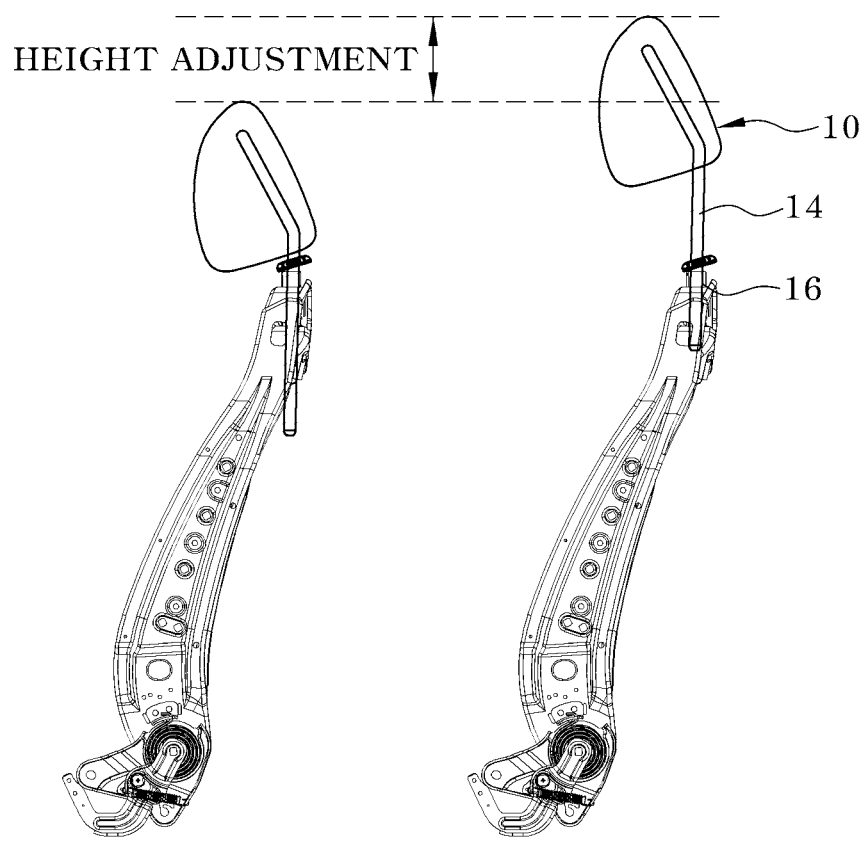
FIG. 2 is a side view of the mounting structure of the conventional headrest.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes, will be determined in portion by the particular intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, embodiments of the present invention will be described in detail with reference to the accompanying drawings.

Figure 3:
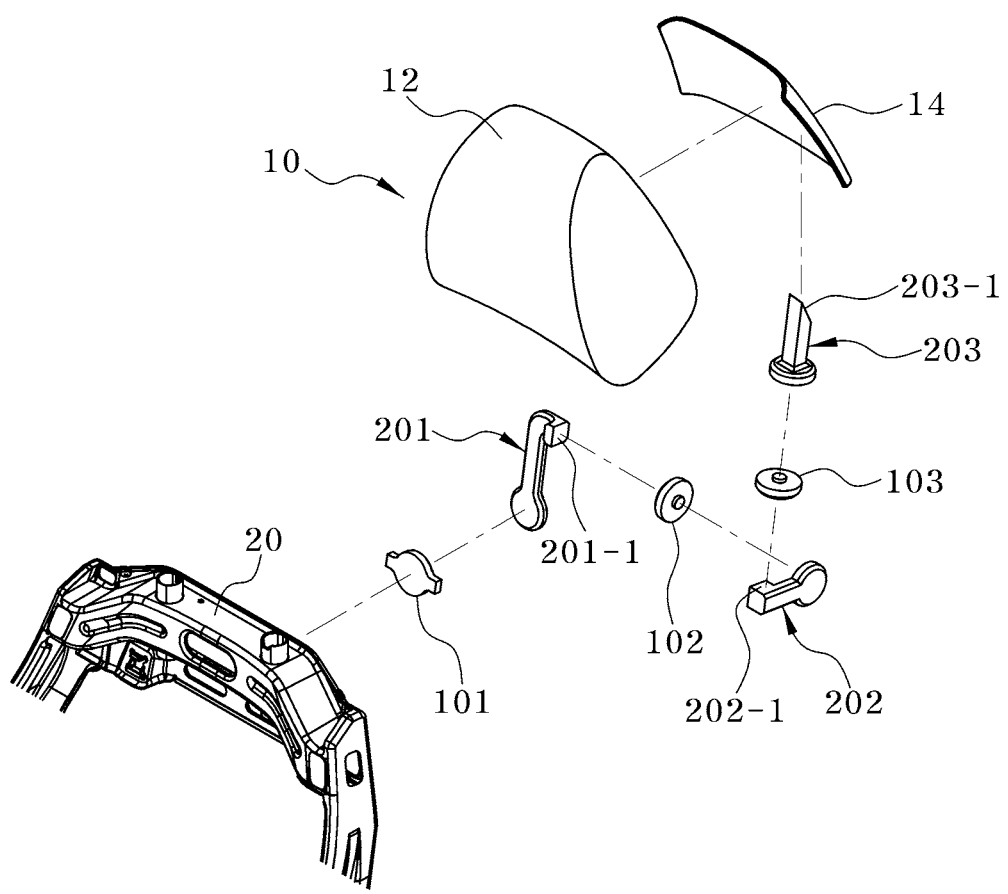
FIG. 3 is an exploded perspective view of a headrest position adjusting device according to an exemplary embodiment of the present invention.
Figure 4A:
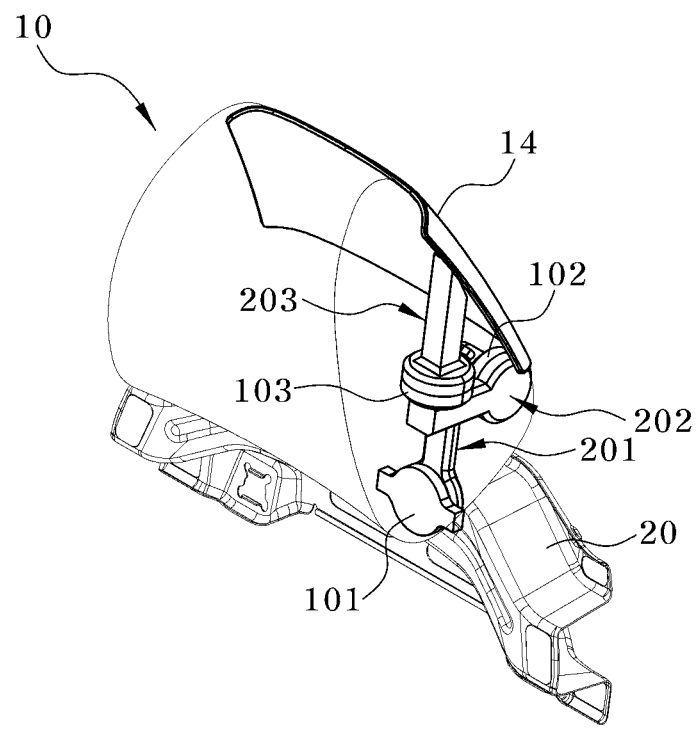
FIG. 4A and FIG. 4B are assembled perspective views of the headrest position adjusting device according to an exemplary embodiment of the present invention.
Figure 4B:
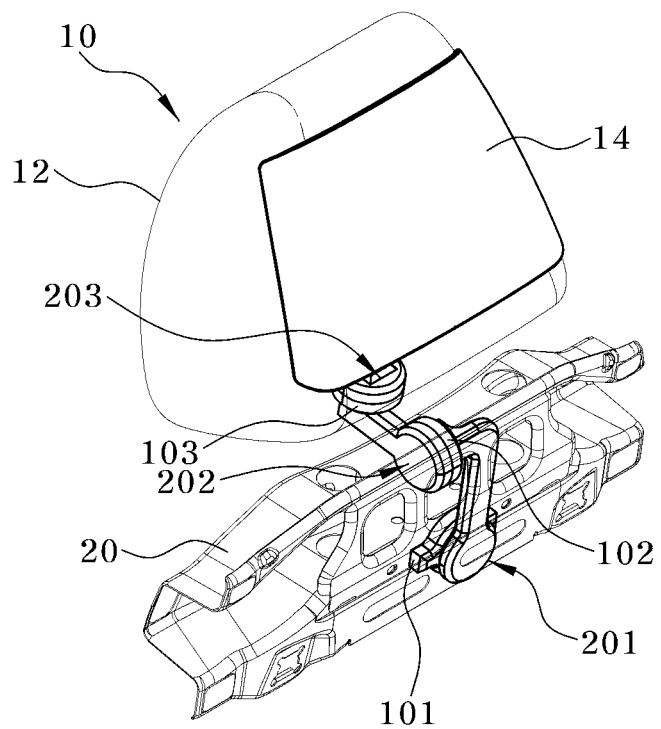

FIG. 3 is an exploded perspective view of a headrest position adjusting device according to an exemplary embodiment of the present invention, and FIG. 4A and FIG. 4B are assembled perspective views of the headrest position adjusting device according to an exemplary embodiment of the present invention. In each drawing, reference numeral 14 denotes a headrest frame, and reference numeral 20 denotes a seatback frame.

The headrest position adjusting device of the present invention is mounted between the headrest frame 14 and the seatback frame 20.

A first motor 101 is mounted to the seatback frame 20 such that the rotation shaft thereof extends backwards.

Furthermore, a first link 201 is connected to the rotation shaft of the first motor 101 to be rotatable to a predetermined angle in the leftward-rightward direction (the X-axis direction).

In more detail, the first link 201 is connected at the lower end portion thereof to the rotation shaft of the first motor 101 in the state of being oriented in the upward-downward direction thereof. Accordingly, upon operation of the first motor 101, the first link 201 rotates to a predetermined angle in the leftward-rightward direction (the X-axis direction) about the lower end portion thereof.

A second motor 102 is mounted to the upper end portion of the first link 201. A first mounting end portion 201-1 is integrally formed with the first link 201 to be perpendicularly bent in the lateral direction at the upper end portion of the first link 201.

In detail, the second motor 102 is mounted on the first mounting end portion 201-1 of the first link 201 such that the rotation shaft thereof is oriented in the lateral direction thereof.

Furthermore, a second link 202 is connected to the rotation shaft of the second motor 102 to be rotatable to a predetermined angle in the upward-downward direction (the Y-axis direction).

In more detail, the second link 202 is connected at the rear end portion thereof to the rotation shaft of the second motor 102 in the state of being oriented in the forward-backward direction thereof. Accordingly, upon operation of the second motor 102, the second link 202 rotates to a predetermined angle in the upward-downward direction (the Y-axis direction) about the rear end portion thereof.

A third motor 103 is mounted to the front end portion of the second link 202. A second mounting end portion 202-1 is integrally formed with the second link 202 to be perpendicularly bent in the upward direction at the front end portion of the second link 202.

In detail, the third motor 103 is mounted on the second mounting end portion 202-1 of the second link 202 such that the rotation shaft thereof is oriented in the upward direction thereof.

Furthermore, a third link 203 is connected to the rotation shaft of the third motor 103 to be rotatable in place.

In more detail, the third link 203 is connected at the lower end portion thereof to the rotation shaft of the third motor 103 in the state of being oriented in the upward-downward direction thereof. Accordingly, upon operation of the third motor 103, the third link 203 rotates in place.

The upper end portion of the third link 203 is secured to the headrest frame 14, which is mounted in a headrest pad 12.

The third link 203 includes an inclined surface 203-1 formed at the upper end portion thereof. The inclined surface 203-1 of the third link 203 is inclined at the same angle as one surface of the headrest frame 14 to be welded to the headrest frame 14.

Figure 8:
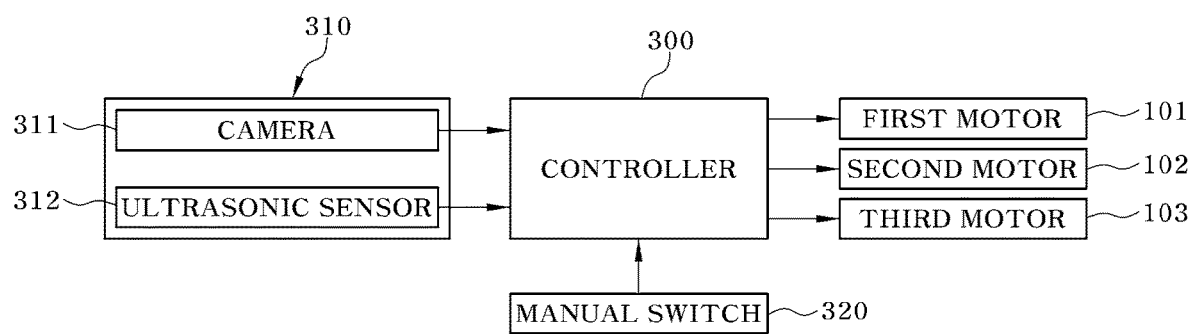
FIG. 8 is a control constitutional diagram of the headrest position adjusting device according to an exemplary embodiment of the present invention.

Meanwhile, as shown in FIG. 8, the headrest position adjusting device according to an exemplary embodiment of the present invention further includes a structure for automatically adjusting the position of the headrest, which includes a head position sensor 310 for detecting the position of the occupant's head supported by the headrest and a controller 300 for receiving a detection signal from the head position sensor and applying a driving current signal to at least one of the first motor 101, the second motor 102, or the third motor 103.

The head position sensor 310 may be configured as a camera 311 or an ultrasonic sensor 312, which is mounted at a predetermined position in the interior of the vehicle.

Thus, the head position sensor 310 detects whether the occupant's head is appropriately supported by the headrest, whether the occupant's head is tilted in a lateral direction away from the normal support area of the headrest, and the distance by which the occupant's head is spaced from the headrest.

As shown in FIG. 8, the headrest position adjusting device according to an exemplary embodiment of the present invention further includes a structure for facilitating an occupant to manually adjust the position of the headrest, which includes a manual switch 320 that the occupant directly manipulates to adjust the position of the headrest. The manual switch 320 may be configured as an operation panel, a touch panel, or the like, which is mounted at a predetermined position in the interior of the vehicle.

The controller 300 receives an operation signal from the manual switch 320, and applies a driving current signal to at least one of the first motor 101, the second motor 102, or the third motor 103.

Hereinafter, the exemplary operation of the headrest position adjusting device according to an exemplary embodiment of the present invention configured as described above will be described.

Figure 5A:
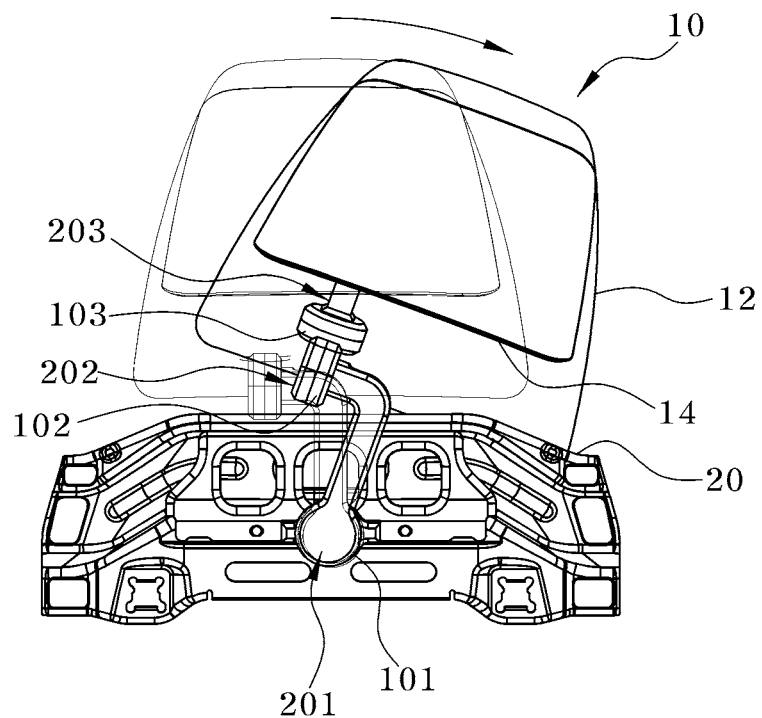
FIG. 5A and FIG. 5B are views illustrating the operation in which a headrest is tilted in a leftward-rightward direction (an X-axis direction) by the headrest position adjusting device according to an exemplary embodiment of the present invention.
Figure 5B:
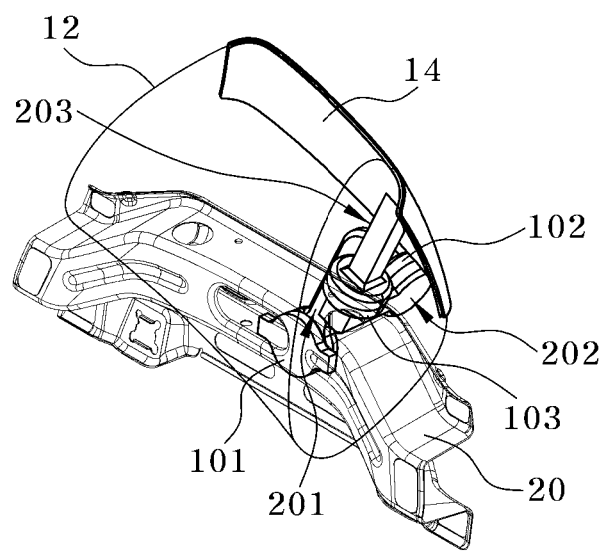

FIG. 5A and FIG. 5B are views illustrating the operation in which the headrest is tilted in the leftward-rightward direction (the X-axis direction) by the headrest position adjusting device according to an exemplary embodiment of the present invention.

First, the head position sensor 310 detects the position of the occupant's head, and transmits the detected position of the occupant's head to the controller 300.

Upon determining that the position of the occupant's head detected by the head position sensor 310 is out of the normal support area of the headrest in any lateral direction (e.g., the state in which the occupant's head is inclined laterally while the occupant is asleep), the controller 300 applies a driving current signal to the first motor 101.

Alternatively, when the occupant directly manipulates the manual switch 320, the controller 300 applies a driving current signal to the first motor 101 in a response to an operation signal (e.g., a signal requiring operation of the first motor) from the manual switch 320.

Accordingly, the first motor 101 is driven, and the rotational force of the first motor 101 is transmitted to the first link 201. Accordingly, as shown in FIG. 5A and FIG. 5B, the first link 201 is rotated in the leftward or rightward direction (the X-axis direction) about the lower end portion thereof. At the same time, the headrest frame 14 is also rotated in the same direction as the first link 201. As a result, the angle to which the headrest 10 is tilted in the leftward or rightward direction is adjusted such that the headrest 10 is located at a position at which it is configured for supporting the occupant's head.

Accordingly, when the position of the occupant's head moves out of the normal support area of the headrest in a lateral direction thereof, as shown in FIG. 5A and FIG. 5B, the headrest 10 is rotated to be tilted in the leftward or rightward direction (the X-axis direction) toward the occupant's head, stably supporting the occupant's head.

Figure 6A:
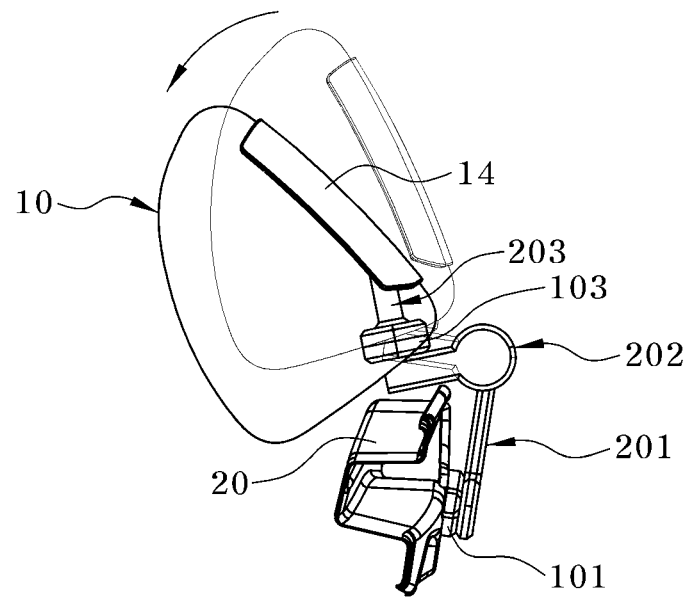
FIG. 6A and FIG. 6B are views illustrating the operation in which a headrest is tilted in an upward-downward direction (a Y-axis direction) by the headrest position adjusting device according to an exemplary embodiment of the present invention.
Figure 6B:
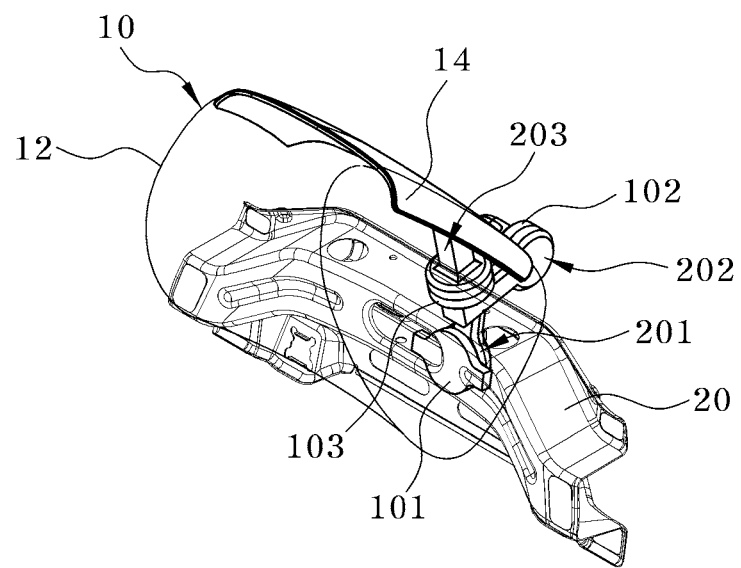

FIG. 6A and FIG. 6B are views illustrating the operation in which the headrest is tilted in the upward-downward direction (the Y-axis direction) by the headrest position adjusting device according to an exemplary embodiment of the present invention.

First, the head position sensor 310 detects the position of the occupant's head and transmits the detected position of the occupant's head to the controller 300.

Upon determining that the position of the occupant's head detected by the head position sensor 310 is out of the normal support area of the headrest in the forward direction (e.g., the state in which the occupant's head is inclined forwards while the occupant is asleep), the controller 300 applies a driving current signal to the second motor 102.

Alternatively, when the occupant directly manipulates the manual switch 320, the controller 300 applies a driving current signal to the second motor 102 in a response to an operation signal (e.g., a signal requiring operation of the second motor) from the manual switch 320.

Accordingly, the second motor 102 is driven, and the rotational force of the second motor 102 is transmitted to the second link 202. Accordingly, as shown in FIG. 6A and FIG. 6B, the second link 202 is rotated in the upward or downward direction (the Y-axis direction) about the rear end portion thereof. At the same time, the headrest frame 14 is also rotated in the same direction as the second link 202. As a result, the angle to which the headrest 10 is tilted in the upward or downward direction is adjusted such that the headrest 10 is located at a position at which it is configured for supporting the occupant's head.

Accordingly, when the position of the occupant's head moves out of the normal support area of the headrest in the forward direction thereof, as shown in FIG. 6A and FIG. 6B, the headrest 10 is rotated to be tilted in the upward or downward direction (the Y-axis direction) toward the occupant's head, stably supporting the occupant's head.

Figure 7A:
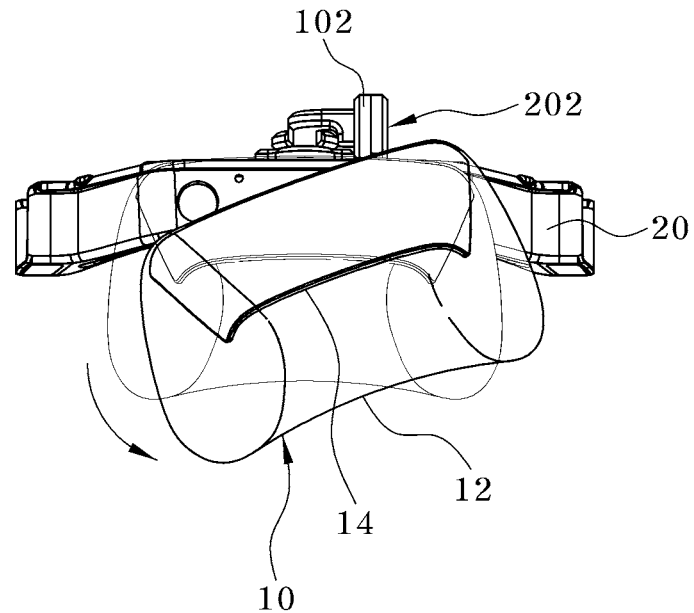
FIG. 7A and FIG. 7B are views illustrating the operation in which a headrest is tilted in a forward-backward direction (a Z-axis direction) by the headrest position adjusting device according to an exemplary embodiment of the present invention.
Figure 7B:
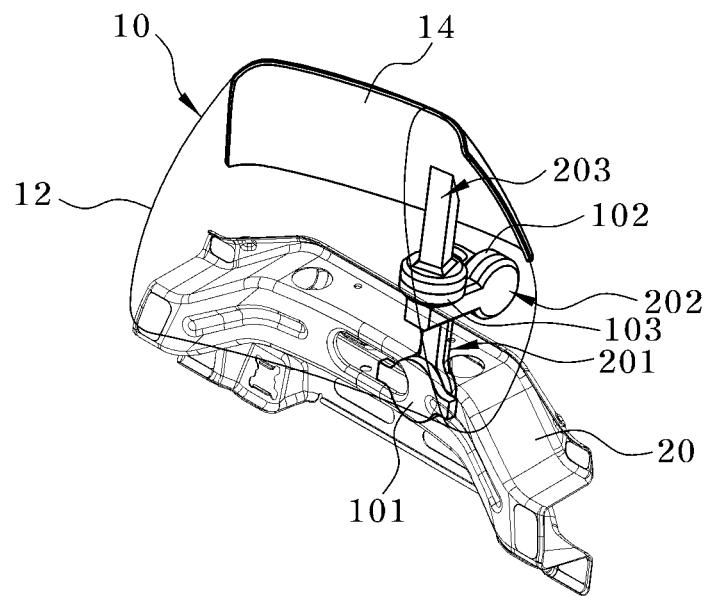

FIG. 7A and FIG. 7B are views illustrating the operation in which the headrest is tilted in the forward-backward direction (the Z-axis direction) by the headrest position adjusting device according to an exemplary embodiment of the present invention.

First, the head position sensor 310 detects the position of the occupant's head and transmits the detected position of the occupant's head to the controller 300.

Upon determining that the position of the occupant's head detected by the head position sensor 310 is out of the normal support area of the headrest in a lateral direction and in the forward direction (e.g., the state in which the occupant's head is inclined laterally and forwards while the occupant is asleep), the controller 300 applies a driving current signal to the third motor 103.

Alternatively, when the occupant directly manipulates the manual switch 320, the controller 300 applies a driving current signal to the third motor 103 in a response to an operation signal (e.g., a signal requiring operation of the third motor) from the manual switch 320.

Accordingly, the third motor 103 is driven, and the rotational force of the third motor 103 is transmitted to the third link 203. Accordingly, as shown in FIG. 7A and FIG. 7B, the third link 203 is rotated in place. At the same time, the headrest frame 14 is also rotated in the forward or backward direction (the Z-axis direction) about the point thereof to which the upper end portion of the third link 203 is coupled. As a result, the angle to which the headrest 10 is tilted in the forward or backward direction is adjusted such that the headrest 10 is located at a position at which it is configured for supporting the occupant's head.

Accordingly, when the position of the occupant's head moves out of the normal support area of the headrest in a lateral direction and in the forward direction thereof, as shown in FIG. 7A and FIG. 7B, the headrest 10 is rotated to be tilted in the forward or backward direction (the Z-axis direction) toward the occupant's head, stably supporting the occupant's head.

Meanwhile, after the position of the headrest 10 is automatically adjusted in the leftward-rightward direction (the X-axis direction), in the upward-downward direction (the Y-axis direction), or in the forward-backward direction (the Z-axis direction), upon determining that the position of the occupant's head detected by the head position sensor 310 is within the normal support area of the headrest, the controller 300 stops applying the driving current signal to the corresponding motor and terminates the headrest position adjustment operation.

As is apparent from the above description, the headrest position adjusting device for a vehicle according to an exemplary embodiment of the present invention has the following effects.

First, it is possible to freely move a headrest in directions corresponding to three-dimensions, namely an X-axis direction thereof, a Y-axis direction thereof, and a Z-axis direction thereof, in accordance with the position of an occupant's head, improving the head support performance and usability of the headrest.

Second, it is possible to automatically move the headrest to a position at which the headrest is configured for supporting the occupant's head using a sensor (a camera, an ultrasonic sensor, or the like) for detecting the position of the occupant's head, further improving the head support performance and usability of the headrest.

For example, the headrest is moved to a position to which the occupant's head moves while the occupant is asleep, stably supporting the occupant's head at all times and further improving the head support performance and usability of the headrest.

Third, since the headrest is moved to the position of the occupant's head upon detection that the vehicle is in a collision, it is possible to appropriately support the occupant's neck and head in the event of a collision, reducing the risk of injury to the occupant's neck or head.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A headrest position adjusting device for a vehicle, the device comprising:
   a first motor mounted to a seatback frame;
   a first link connected to the first motor in a first direction to be rotatable to a predetermined first angle with respect to a rotation axis of the first motor;
   a second motor mounted to the first link;
   a second link connected to the second motor in a second direction to be rotatable to a predetermined second angle with respect to a rotation axis of the second motor;
   a third motor mounted to the second link;
   a third link connected to the third motor in a third direction to be rotatable with respect to a rotation axis of the third motor; and
   a headrest frame connected to the third link and mounted in a headrest pad.

2. The headrest position adjusting device of claim 1, wherein, the rotation axis of the first link, the second link and the third link are aligned perpendicular to each other.

3. The headrest position adjusting device of claim 1,
   wherein the first link is oriented in the second and third directions thereof, the second and third directions being coplanar, and
   wherein a rotation shaft of the first motor is connected to a lower end portion of the first link to transmit a rotational force to the first link.

4. The headrest position adjusting device of claim 1,
   wherein the first link includes a first mounting end portion integrally formed at an end of the first link, the first mounting end portion being perpendicularly bent in a lateral direction at an upper end portion of the first link, and
   wherein the second motor is mounted on the first mounting end portion.

5. The headrest position adjusting device of claim 1,
   wherein the second link is oriented in the first direction thereof, and
   wherein a rotation shaft of the second motor is connected to a rear end portion of the second link in the second direction to transmit rotational force to the second link.

6. The headrest position adjusting device of claim 1,
   wherein the second link includes a second mounting end portion integrally formed at an end of the second link, the second mounting end portion being perpendicularly bent in the second direction at a front end portion of the second link, and
   wherein the third motor is mounted on the second mounting end portion in the third direction.

7. The headrest position adjusting device of claim 1,
   wherein the third link is oriented in the third direction, and
   wherein a rotation shaft of the third motor is connected to a lower end portion of the third link in the third direction to transmit rotational force to the third link.

8. The headrest position adjusting device of claim 1,
   wherein the third link includes an inclined surface formed at an upper end portion of the third link, the inclined surface being inclined at a same angle as an angle at which the headrest frame is mounted to be secured to a portion of the headrest frame.

9. The headrest position adjusting device of claim 1, further including:
   a head position sensor configured to detect a position of an occupant's head supported by a headrest;
   a manual switch configured to be manipulated by the occupant to manually adjust a position of the headrest; and
   a controller engaged to the head position sensor and the manual switch and configured to receive a detection signal from the head position sensor or an operation signal from the manual switch and to apply a driving current signal to at least one of the first motor, the second motor, or the third motor.

10. The headrest position adjusting device of claim 9, wherein the head position sensor includes a camera or an ultrasonic sensor mounted at a predetermined position in an interior of a vehicle.

11. The headrest position adjusting device of claim 1, wherein, upon operation of the first motor, the first link rotates in the second and third directions about a lower end portion of the first link and the headrest frame rotates in the second and third directions therewith so that an angle to which a headrest is tilted in the second and third directions is adjusted, the second and third directions being coplanar.

12. The headrest position adjusting device of claim 1, wherein, upon operation of the second motor, the second link rotates in the third direction about a rear end portion of the second link and the headrest frame rotates in the first and third directions with the second link so that an angle to which a headrest is tilted in the first and third directions is adjusted, the first and third directions being coplanar.

13. The headrest position adjusting device of claim 1, wherein, upon operation of the third motor, the third link rotates and the headrest frame rotates in the first and second directions about the third link so that an angle to which a headrest is tilted in the first and second directions is adjusted, the first and second directions being coplanar.

* * * * *